Patented Jan. 13, 1953

2,625,529

UNITED STATES PATENT OFFICE 2,625,529

METHOD OF CONDITIONING SOILS

Ross M. Hedrick and David T. Mowry, Dayton, Ohio, assignors to Monsanto Chemical Company, St. Louis, Mo., a corporation of Delaware No Drawing. Application February 12, 1952, Serial No. 271,280

19 Claims. (Cl. 260—41)

The present invention relates to methods of improving the physical structure of soils. More specifically the invention relates to soil improvements for increasing crop yields and preventing natural erosion.

The ultimate utility and the beneficial properties of top soils and soils of sub-surface strata depend substantially upon the physical structure of that soil. Although most soils have a fine state of subdivision necessary for the growth of plants, many do not have other physical properties which enable the proper growth and development of the plant structures and the proper performance of the various plant functions. In addition to the plant nutrients a soil must have a continuous supply of both air and moisture. Soils of poor structure may become water-logged during wet seasons, which state excludes the air necessary for optimum growth and development of the plant. Soils of poor structure may lose moisture too rapidly by evaporation from the surface due to excessive capillary action, and plants growing therein will be deprived of the required continuous and abundant supply of moisture. The latter effect becomes excessive in closely compacted soils where also the growth of roots and stems are retarded due to unfavorable growing conditions. Soils of poor structure are subject to shrinkage which induces undesirable compaction, especially in the form of a surface crust, and produces cracks or fissures which increase the rate of transfer of soil moisture to the atmosphere. Furthermore, soils of poor structure frequently experience poor germination of seeds planted therein due to the lack of either air or moisture required for normal germination.

It is also well-known that soils of poor structure are subject to erosion, because when subjected to rainfall they soon become puddled and the excess moisture flows across the surface of the soil or in a confined channel. This surface water washes away the fine soil particles and results in the displacement of large quantities of valuable soils. Much of the damage to soils of poor structure is directly attributable to raindrop impact which breaks down the existing aggregates into smaller and more readily removable fragments. The quantity of surface water is increased both by the failure of the soil to absorb surface water and by the failure of the soil to provide a medium for transferring the water to underlying bodies of soil or to natural water courses.

The problem of increasing the tilth of soils and the problem of preventing erosion may both be solved or greatly diminished by providing a means of improving the physical structure of the soil. When soil is plowed and raked it is possible to provide a loose structure which retains moisture better and contains sufficient air for the propagation of plants. The improvement of soil structure by the tillage is not long lasting and the action of rain and sun will soon cause the soil to slake down to form a dense compact structure with a hard impervious crust, thereby losing its desirable properties. If soil is cultivated over a number of years and especially if organic fertilizers are added thereto, the soil may gradually attain good structure of more permanent nature. This improvement in the structure is believed to be due to various humus materials, including polysaccharides, generated by the soil bacteria which decompose the organic additives. The improved soil structure enables larger quantities of air to be present and permits the maintenance of a more uniform supply of moisture in the soil, thereby providing a more suitable medium for the further culturing of soil bacteria. By this process the soil structure is improved by a cumulative process. Since clay and heavy loam soils may require many years to develop a satisfactory structure, it is desirable to provide a means of accelerating the formation of fertile soils. The development of good structure by intensive mechanical cultivation is not only short-lived but is frequently deleterious to the growing plants, due to the severance of the shallow feeder roots. If permanently improved structure could be maintained without the mechanical breaking of the surface layers, the rate of growth and the crop yields would be further improved.

The primary purpose of this invention is to provide a means of quickly developing good soil structure by synthetic additives. A further purpose of this invention is to provide a means of increasing the agricultural yield of soils and particularly of soils of poor normal structure. A still further purpose is to provide a means of minimizing erosion on exposed soil surfaces. A still further purpose of this invention is to provide synthetic substances which permit the simultaneous improvement in the erosion characteristics of the soil and in the development of suitable cover crops.

Soils of permanently good structure have the fine soil particles agglomerated into larger bodies or crumbs, which permit ready access of the air in their interstices and at the same time retain moisture in an available form within the body of the crumbs. Soil of this structure will not lose moisture excessively by evaporation due to the insulation effect of the spaces or non-capillary pores containing air of high humidity which prevent excessive capillary action. Such soil does not shrink and form fissures and cracks on drying and retains a natural surface mulch which reduces evaporation. Thus, the optimum moisture and air content may be retained over long periods of time.

The use of this invention in the development of good soil structure by synthetic additives will be practicable in a wide variety of applications. It is useful in the rapid improvement of garden soils, especially in areas where infertile sub-soil has been exposed. It is also useful in the improvement of average soils, and especially in areas where organic fertilizers are not available. It is also useful to enable the growth of root crops in areas where the closely compacted clay soil prevents the normal development of such crops. It is further useful in semi-arid regions where retention of soil moisture and minimization of solar evaporation are desirable. It is also useful in growing cover crops on road shoulders, filled areas and graded embankments where erosion control is needed until such crops become well-established. Furthermore, the invention is useful in the prevention of erosion in areas where surface vegetation has been destroyed by natural phenomena or by misuse of soils. Further benefits of the present invention which result from the improvements in the normal soil structure are also contemplated.

In accordance with this invention is has been found that soils, and particularly clay and silty loam soils of poor structure, can be greatly improved by the addition of traces of polymeric water-soluble polyelectrolytes preferably having a molecular weight of at least 10,000, and containing a substantially linear continuous carbon chain derived by the polymerization of an aliphatic unsaturated group.

By "polyelectrolyte" it is intended to include only polymeric organic substances which, when contacted with an aqueous medium, will form organic ions having a substantial number of electrical charges distributed at a plurality of positions thereon.

One type of compound useful in the practice of the invention is the equimolar copolymer of a polycarboxylic acid derivative and at least one other monomer copolymerizable therewith. The polycarboxlyic acid derivative may be maleic anhydride, maleic acid, fumaric acid, itaconic acid, citraconic acid, aconitic acid, the amides of these acids, the alkali metal, alkaline earth metal, and ammonium salts of these acids, the partial alkyl esters, salts of the partial alkyl esters and the substituted amides of these polycarboxylic acids. The carboxylic acid, carboxylic acid salt, amide and substituted amide radicals are the ionizable groups which contribute to the hydrophilic properties and tend to make the polymers water-soluble. The hydrophilic properties may be entirely, or in part, due to the comonomer when acrylic acid, acrylamide, acrylic acid salts of alkali metals and ammonium, N-substituted acrylamide and the corresponding derivatives of methacrylic, crotonic or other polymerizable acids are used. Thus, a copolymer of a dialkyl maleate and acrylic acid will be a water-soluble polyelectrolyte. When the hydrophilic maleic acid derivatives are used, hydrophobic comonomers may be used, for example ethylene, propylene, isobutylene, styrene, α-methylstyrene, vinyl acetate, vinyl chloride, vinyl formate, vinyl alkyl ethers, alkyl acrylates and alkyl methacrylates. In the practice of this invention the dibasic polybasic acid derivatives of the copolymers may be maleic acid, maleic anhydride, sodium maleate, potassium maleate, ammonium maleate, calcium maleate, monosodium maleate, monopotassium maleate, monoammonium maleate, monocalcium maleate, and a monoalkyl maleate, maleic acid amide, the partial amide of maleic acid, the N-alkyl substituted maleic acid amide, the N-aminoethyl maleamide, the N-aminoethyl maleimide, the alkylaminoalkyl maleamides, and the corresponding derivatives of itaconic, citraconic, fumaric and aconitic acids. Any of the said polybasic acid derivatives may be copolymerzed with any of the other monomers described above, and any other which forms a copolymer with dibasic acid derivatives in equimolar proportions. The polybasic acid derivatives may be copolymers with a plurality of comonomers, in which case the total molar proportions of the comonomers will be equimolar with respect to the polybasic acid derivatives. Although these copolymers may be prepared by direct polymerization of the various monomers, frequently they are more easily prepared by an after reaction of other copolymers. For example, copolymers of maleic anhydride and another monomer may be converted to maleic acid copolymers by reaction with water and to metal salt copolymers by reaction with alkali metal compounds, alkaline earth metal compounds or ammonium compounds.

Certain of the hydrophilic derivatives of unsaturated polycarboxylic acids may be polymerizable in less than equimolar proportions with certain of the less hydrophobic comonomers, for example vinyl formate and vinyl acetate, or with monomers with ionizable groups, such as acrylic acid, the alkali metal and ammonium salts of acrylic acid, acrylamides, and the various N-substituted acrylamides, methacrylic acid, the alkali metal and ammonium salts of methacrylic acid, methacrylamide and the various N-substituted methacrylamides, crotonic acids and the alkali metal and ammonium salts of crotonic acids, the crotonamides and the N-substituted crotonamides, vinyl sulfonic acid, and vinyl phosphonic acid. The hydrophilic derivatives of polycarboxylic acids include the half alkyl esters of maleic acid, and the partial alkyl esters of fumaric, itaconic, citraconic and aconitic acids. When less than 50 mole percent of these hydrophilic polybasic acid derivatives are used, and especially with the hydrophobic monomers, such as vinyl acetate and vinyl formate, the minimum proportion of polybasic acid derivative is that which will render the copolymer water-soluble.

Another modification of the copolymers of the various unsaturated polycarboxylic acid derivatives are those wherein more than 50 mole per cent of the polycarboxylic acid derivative is copolymerized therein. This type of which fumaric acid and itaconic acid are examples of the hydrophilic monomer may involve a wide variation with respect to the non-hydrophilic monomer, ethylene, propylene, isobutylene, styrene, α-methylstyrene, vinyl acetate, vinyl formate, vinyl alkyl ethers, alkyl acrylates, and alkyl methacrylates being useful. If desired, the comonomer may be one which contributes to the hydrophilic property, for example vinyl alcohols, acrylic acid, methacrylic acid, acrylamide, methacrylamide and the various amides which have alkyl, aminoalkyl, or alkylaminoalkyl substituents on the nitrogen atom. The proportions of these various comonomers contemplate the use of more than 50 mole per cent of the polybasic acid derivative and less than 50 mole per cent of the comonomer. The comonomer may be used in relatively small proportions, depending upon the hydrophilic or hydrophobic nature of the comonomer; sufficient total hydrophilic groups in both monomers must be present to render the resultant copolymer soluble in water under the conditions of use. This type of copolymer may involve a plurality of the polycarboxylic acid derivatives and/or a plurality of the comonomers.

Other suitable polyelectrolytic polymers are the polymers of acrylic or methacrylic acid derivatives, for example acrylic acid, the alkali metal and ammonium salts of acrylic acid, methacrylic acid, the alkali metal and ammonium salts of methacrylic acid, acrylamide, methacrylamide, the N-alkyl substituted amides, the N-aminoalkylamides, and the corresponding N-alkyl-aminoalkyl substituted amides, the aminoalkyl acrylates, the aminoalkyl methacrylamides and the N-alkyl substituted aminoalkyl esters of either acrylic or methacrylic acids. These polymeric compositions may be the homopolymers or they may be copolymers with other copolymerizing monomers such as ethylene, propylene, isobutylene, styrene, α-methylstyrene, vinyl acetate, vinyl formate, alkyl ethers, acrylonitrile, methacrylonitrile, vinyl chloride, vinylidene chloride, the alkyl acrylates, the alkyl methacrylates, the alkyl maleates, and the alkyl fumarates, and other olefinic monomers copolymerizable therewith. The copolymers of this type, having at least 50 mole per cent of the acrylic or methacrylic acid derivatives, are preferred, and especially when the comonomer is hydrophobic or has no ionizable groups. Polymers of this type may be prepared directly by the polymerization of suitable monomers, or by the after chemical reaction of other polymers, for example by the hydrolysis of acrylonitrile or methacrylonitrile polymers.

Other useful polymeric polyelectrolytes are the polymers which derive their hydrophilic characteristics from the presence of amine radicals. These include the polyvinylpyridines, the poly-N-vinyl amines, the poly-N-allylamines, the heterocyclic nitrogen compounds wherein the nitrogen is a tertiary amino group, and the amine and ammonium salts of said cyclic compounds. The vinyl amines may be present in copolymers with vinyl acetate, vinyl formate, vinyl chloride, acrylonitrile, styrene, esters of acrylic acid, esters of methacrylic acid, and other monomers capable of existing in copolymeric form with the N-vinyl amines. Included within the scope of this type of polymeric polyelectrolyte are the polymers of products derived by the hydrolysis of amides and imides, such as N-vinylformamide, N-vinylacetamide, N-vinylbenzamide, N-vinyl-N-methylformamide, N-vinyl-N-methylacetamide, N-vinyl-N-methylbenzamide, N-vinylphthalimide, N-vinylsuccimide, N-vinyldiformamide, and N-vinyldiacetamide. Similarly, copolymers of these various amides with other polymerizable monomers may be first prepared and subsequently hydrolyzed to the corresponding vinyl amine derivatives. The polyallylamines and polymethallylamines and copolymers thereof may be prepared by copolymerizing acrylonitrile or methacrylonitrile, alone or in the presence of other monomers, and then by hydrogenation converted into amine-containing polymers.

Another important class of polymeric polyelectrolytes are the polymers of vinyl substituted amides, such as N-vinyl-N-methylformamide, N-vinylformamide, N-vinylacetamide, and other vinyl substituted amides, the polymers of which are water-soluble. Useful compounds include homopolymers and copolymers with vinyl acetate, acrylonitrile, isobutylene, ethylene, styrene, vinyl chloride, vinylidene chloride, vinyl formate, vinyl alkyl ethers, alkyl acrylates, alkyl methacrylates, and copolymers with the more hydrophilic monomers, such as acrylic acid, methacrylic acid, acrylamide, methacrylamide, the various substituted amides, monoalkyl esters of maleic acid, the aminoalkyl esters of acrylic or other polymerizable acids, the alkali metal and ammonium salts of acrylic or other polymerizable acids, and other polymerizable compounds with ionizable functions.

Another class of polymeric polyelectrolytes are the polymers of vinyl sulfonic acid, and the copolymers of vinyl sulfonic acid with one or more polymerizable organic monomers, for example vinyl chloride, acrylonitrile, styrene, vinyl acetate and other polymerizable mono-olefinic compounds. Although the polymers and copolymers of vinyl sulfonic acid may be prepared by direct polymerization, they are more easily prepared by indirect methods. For example, polymers and copolymers of vinyl sulfonyl chloride may be first prepared and then hydrolyzed for conversion into vinyl sulfonic acid polymers, the vinyl sulfonic acid salt polymers, the vinyl sulfonic acid amides, and other vinyl sulfonic acid derivatives capable of ionization in aqueous solutions. Another useful indirect method of preparing this class of polymeric polyelectrolytes involves the preparation of polymers of unsaturated hydrocarbons, for example ethylene, propylene, isobutylene, styrene, α-methylstyrene, and others, or the copolymers of the said unsaturated hydrocarbons and other polymerizable monoolefinic compounds such as vinyl chloride, acrylonitrile, vinyl acetate, methyl methacrylates, alkyl acrylates and others, and thereafter introducing the sulfonic acid nuclei by a conventional sulfonation reaction. The sulfonic acid groups so introduced may be converted to sulfonic acid salts, acid amides or other electrolytic grouping. The copolymers of this type may involve the use of a plurality of sulfonic acid monomers and/or a plurality of the conventional comonomers as described.

As described above in connection with the various types of polyelectrolytic polymers suitable for the practice of this invention, the hydrophilic polymer may be prepared directly by the polymerization or copolymerization of one or more of the various available organic monomers with aliphatic unsaturation, if the said compounds contain a hydrophilic group, for example carboxyl groups. Generally, more types of polyelectrolytic polymers can be prepared by subsequent reactions of polymers and copolymers. For example, polymers containing nitrile groups may be hydrolyzed to form water-soluble amide and carboxy containing polymers or hydrogenated to form amine containing polymers. Similarly copolymers of maleic anhydride and vinyl acetate may be hydrolyzed to form polymers containing hydrophilic lactone rings. Other hydrophilic polymers may be prepared by the hydrolysis of copolymers of vinyl acetate wherein the acetyl groups are removed leaving hydroxy groups which promote the solubilization effect of polyelectrolytic groups present. By other reactions non-hydrophilic polymers may be converted into lactam or amide containing polymers which are more hydrophilic. Polyvinyl alcohol, not in itself a polyelectrolyte, may be converted into polyelectrolytes by esterification with dibasic acids, one of said carboxylic acid groups reacting with the alcohol radical and the other providing the hydrophilic characteristics by a carboxy group on the side chain. Still other types of polymers may be prepared by reacting halogen containing polymers, for example the polymers or copolymers of vinyl chloroacetate or vinyl chloroethyl ether, with amines to form amine salt radicals and quaternary ammonium radicals whereby hydrophilic characteristics are introduced into what otherwise would be an insoluble polymer. Other soluble polymers may be prepared by the ammonolysis of ketone containing polymers, for example polyvinyl methyl ketone. Similarly active halogen atoms may be reacted with bisulfite to substitute sulfonic acid group for the reactive halogens. Other types of polymers prepared by the subsequent reaction of previously prepared polymers have been explained above in connection with the sulfonic and sulfonic acid salts of polymeric hydrocarbons and in connection with the vinyl amine polymers by hydrolysis of the N-vinyl amides.

In the specification and claims copolymers are identified in terms of their monomeric constituents. The names so applied refer to the molecular structure and are not limited to the polymers prepared by the copolymerization of the specified monomers. In many instances the identical copolymers may be prepared from other monomers and converted by subsequent chemical reaction to the desired copolymer.

Thus, the various polyelectrolytes of the types described above are ethylenic polymers having numerous side chains distributed along a substantially linear continuous carbon atom molecule. The side chains may be hydrocarbon groups, carboxylic acid groups or derivatives thereof, sulfonic acid groups, or derivatives thereof, phosphonic acid or derivatives thereof, heterocyclic nitrogen groups, aminoalkyl groups, alkoxy radicals and other organic groups, the number of which groups and the relative proportions of hydrophilic and hydrophobic groups being such as to provide a water-soluble polymeric compound having a substantially large number of ionizable radicals. The length of the said continuous carbon chain must be such as to provide compounds having a weight-average molecular weights of at least 10,000.

The expression "water-soluble polymers" as intended by its use in this specification and its appended claims, includes those which form homogeneous mixtures with water, the difficultly soluble polymers which expand in the presence of water and dissolve to at least some extent, and even some which are apparently insoluble in distilled water but which tend to dissolve in soil water. This solubility enables the movement of the molecules within the soil mass through the medium of the soil moisture.

Although most of the polyelectrolytes described above are hydrophilic in nature and do not render the soil water-repellent, there are a few of the polymers which, even though water-soluble, will make the soil water-repellent if used in excessive quantities. These polymers are those which have relatively high molecular weight dependent chains or which have a minimum number of ionizable groups. Although compositions of this kind are of marginal interest, they are entirely operative in producing improved structure, and when added in carefully controlled proportions, the objectionable water-repellent property of treated soils can be avoided.

The polymers as described above may be added to the soil to the extent of from 0.001 to 2 per cent by weight of the tillable surface soil but optimum results are obtained by the use of from 0.01 to 0.2 per cent.

For optimum beneficial effect the molecular weight of the polymer is of some importance. It appears that molecular weights in excess of 10,000, are desirable and the optimum practice requires molecular weights above approximately 15,000. With some polymers the effect reaches a maximum at 30,000, to 100,000, and further increases in molecular weights may not improve the polymer, although no serious reduction is experienced. Cross-linked polymers are operative, but linear polymers are preferred. The molecular weights are those determined by the light scattering method developed by P. Debye and described in detail by him in the Journal Physics and Colloid Chemistry, 51, page 18 (1947). That these values are the weight average molecular weights is clearly established and proved mathematically by B. H. Zimm and P. M. Doty in the Journal of Chemical Physics 12, page 203 (1944).

The polymers may be added directly to the soils if desired, but it is usually more feasible to add the polymers with a diluent or extender, which may be a solvent, for example water, or a solid carrier, such as peat moss, limestone, sand, clay, or other soil, mineral fertilizer, silage or other fertilizing or soil improving substances. When added with a plant nutrient cooperative beneficial effects are noted in the rate of growth of crops on the treated soil. Soils improved by the fertilizer containing the polymers enable more rapid and abundant crop growth than can be obtained by the use of fertilizer alone. The utilization by the plants of any of the known fertilizer materials, containing basic nutrients, such as nitrogen, phosphorus and potassium, as well as trace elements, such as boron, manganese, magnesium, molybdenum, cobalt and iron, may be improved by the addition of the structure-improving polymers described above.

The polyelectroyltes may have chemically reactive groups, for example acid anhydride, carboxyl, hydroxyl or other groups which may combine with the various acidic or basic components added thereto. For example the metal salts or lime of the fertilizing composition may react with the acidic polymer groups; similarly, the hydroxyl or amino radicals of the polymers may combine with the acidic fertilizer radicals. Polymers modified by these collateral reactions are intended to be included as part of this invention.

In accordance with the practice of this invention soils, and particularly soils of poor structure, may be conditioned by intimately dispersing the polymer in the soil, which may be done by adding the polymer and mixing by spading, cultivating, disking, harrowing, or other mixing methods commonly used in agricultural arts. The polymers appear to react through the medium of soil water and unless the soil is parched there is sufficient moisture present for effective incorporation. Often it is advantageous to utilize additional moisture provided by rainfall or artificially through a spraying or irrigation procedure. When additional moisture is to be provided it is desirable for the polymers to be thoroughly mixed before wetting. After the polymer is dispersed in the soil, it is sometimes beneficial to work the soil thereby forming stable aggregates of the desired size. Polymers added to the surface of soil will ultimately become dispersed in the soil and the structure thereby improved, but such an expedient requires a longer period of time for effective improvement. In the latter case the polymeric substance diffuses into the soil through the soil moisture aided by the normal cycles of wetting and drying and freezing and thawing.

An alternate method of the use of the polymers involves the preparation of water solutions and the application to the soils in this form. This method of application is particularly useful in treating fields under cultivation in which plants are growing, particularly those newly transplanted, or freshly seeded soils. By treating the areas immediately adjacent the growing plants or the planted seeds effective aggregation of the critical areas can be accomplished without expending polymers on the non-productive areas. It has been found that polymer solutions will effectively stabilize normally unstable aggregates merely by the addition of water solutions of the polymers to the cultivated soils and that no further mixing or separate aggregating step is necessary.

The availability of oxygen to plant roots in soil in the presence of various amounts of water is conveniently measured by the technique of Webley, Quastel et al., described in detail in the J. Agr. Sci. 37, 257 (1947). In this procedure a microorganism such as yeast is substituted for plant roots and the rate of utilization of oxygen by the yeast suspended in a glucose solution is measured in a Warburg apparatus by a manometric method. The carbon dioxide evolved in the metabolic process is absorbed by potassium hydroxide in a center well so that the change in gas volume is caused by oxygen utilized by the yeast and soil micro-organisms. The oxygen uptake by the same amount of yeast under optimum conditions is obtained from a well-shaken suspension of yeast in glucose solution in the absence of soil crumbs. Although the oxygen consumption of naturally occurring soil microorganisms is low compared with that of the relatively large amount of yeast used, it is measured by the absorption of oxygen in a Warburg flask containing soil and glucose solution but no yeast.

Soils in good tilth retain their porous crumb structure in the presence of large amounts of water. The yeast suspension in water is therefore spread over a large surface and oxygen can diffuse through the relatively thin films of water. High oxygen uptake by yeast is obtained on this type of soil. Soils of poor structure break down to a mud as the amount of water is increased and much less oxygen can diffuse through the thick water films. Thus, the oxygen uptake by yeast in this type of soil is much lower. By this technique, therefore, the effect of added materials on soil structure can be measured by measuring the rate of respiration of yeast in contact with soil crumbs under controlled condition. The rate of respiration is expressed as the aeration factor (A. F.) where:

$$A.\ F. = \frac{\text{Rate of oxygen uptake by yeast on soil crumbs} \times 100}{\text{Rate of oxygen uptake by yeast in shaken glucose solution}}$$

Soils with good structure give high A. F. values while soils with poor structure give low A. F. values.

More precise measurements of aggregate stability of soils are provided by a wet-sieving technique as described in the examples. Soil aggregates must have sufficient stability to maintain their identity when subjected to such dispersive actions as raindrop impact, tillage operations, percolating water, and the compressive forces of the overlying soil mass. Measurement of aggregate stability has therefore been used by soil physicists as one means of evaluating soil structure.

The presence of water-stable aggregates results in a combination of capillary and non-capillary pores, whereas a soil of poor structure has few non-capillary pores. The looseness and porosity in a soil composed of stable aggregates permits the rapid infiltration of water and rapid percolation of excess water downward through the soil. The soil regains the condition of optimum aeration soon after rainfall ceases.

The moisture content of the soil after free drainage under the influence of gravity has removed excess water in non-capillary pores is termed "field capacity" and closely approximates the moisture equivalent which is readily determined in the laboratory. Treatment of the soil with hydrophilic polymers raised the moisture equivalent significantly and therefore the treated soil retains a higher percentage of the water which percolates through it after a rainfall. That this extra water was not held at the expense of proper aeration was demonstrated above by the "aeration factor."

The wilting point, that is, the moisture content of the soil below which plants are no longer able to extract sufficient water from the soil, determines the lower limit of available water for plant growth. The described polyelectrolytes usually have no effect on the silting point of the soil, but sometimes cause a very slight, but not objectionable, elevation. Since the increase in moisture equivalent is much greater than the increase in the wilting point, treatment of soil with the polymers results in a substantial increase in the amount of water retained by the soil and available for plant use.

The increased infiltration and percolation exhibited by soils composed of water-stable aggregates results in reduced runoff during a rainfall and therefore reduced erosion by running water. The aggregates, by virtue of their size and weight, are less readily carried by water and in addition are more stable to the destructive action of raindrops.

The rate of evaporation of water from the surface is affected by soil structure and also by the presence of organic colloids in the soil. A soil of good structure, such as is obtained by proper treatment of a soil with one of the described polyelectrolytes and composed of water-stable aggregates, has in addition to capillary pores a large number of non-capillary pores. The action of these non-capillary pores is to break the continuity of the capillary pores to slow down movement of moisture by capillary action. The transference of capillary water to the surface of the soil is slowed down and therefore the loss of moisture by evaporation from the surface is reduced.

The "working properties" or consistency of a soil are influenced by the state of aggregation of the soil. Soil of poor structure, when treated with one of the polyelectrolytes, loses its stickiness and becomes loose and crumbly, becomes plastic at a higher water content and compared to the untreated soil behaves generally as if it were at a lower moisture content.

In order to show that the polymers themselves are not harmful to soil micro-organisms and to demonstrate the improved moisture relationships and aeration of treated soils, an experiment was conducted on the rate of nitrification in treated and untreated soil. Since this experiment required crumbs stable to water, it was carried out with a woods soil of excellent structure. However, even with the soil of good structure an increase in the rate of nitrification was observed with the treated soil. The effect of increasing the microbiological activity by treatment with polymers to improve the structure should extend to processes such as nitrogen fixation and decomposition of organic matter with liberation of nutrients.

Further details of the invention are set forth with respect to the following specific examples:

EXAMPLE 1

Water-soluble polymers and solutions thereof were prepared by the following techniques:

1. *Polyacrylamide.*—Ten grams of acrylamide and 0.05 gram of potassium persulfate were dissolved in 90 ml. of water and heated in an oven at 60° C. for five hours. Because of some hydrolysis the polymer contained some ammonium salt and imide groups in addition to acrylamide units. The solution was diluted with 400 ml. of water for use in further tests.

2. *Dimethylaminoethyl polymethacrylate.*—Ten grams of dimethylaminoethyl methacrylate, and 3.86 grams of glacial acetic acid and 0.2 gram of potassium persulfate were dissolved in 90 ml. of water. This was placed in an oven at 70° C. overnight before dilution with 400 ml. of water.

3. *Sodium polyacrylate-vinyl alcohol copolymer.*—Ten grams of a finely ground copolymer of acrylonitrile (95%) and vinyl acetate (5%) having a specific viscosity of 0.28 (0.1% solution in dimethylformamide) was suspended in a solution of 0.1 gram of stearic acid and seven grams of sodium hydroxide in 400 ml. of water. The suspension was stirred and refluxed for ten hours during which time the polymer dissolved because of the hydrolysis of nitrile to amide and carboxylic acid sodium salt groups. The resultant solution was adjusted to a pH of eight by the addition of a small amount of hydrochloric acid and the solution diluted with water to 500 ml. total volume.

4. *Acrylamide-acrylonitrile copolymer.*—Ninety grams of acrylamide, ten grams of acrylonitrile, 0.2 gram of potassium persulfate and 0.1 gram of sodium bisulfite were dissolved in one liter of 50 per cent methyl alcohol and heated for four days at 60° C. The resultant precipitated polymer was then filtered, washed with methanol and dried. Two grams of this material was dissolved in 98 ml. of water for evaluation.

5. *Sodium polymethacrylate.*—Fifty grams of polymethacrylic acid having a specific viscosity of 1.25 (0.4% solution in dimethylformamide) and 17.5 grams of sodium hydroxide were dissolved in a liter of water.

6. *Ammonium polymethacrylate.*—Two grams of the polymethacrylic acid described above were dissolved in a mixture of 96 ml. of water and two ml. of concentrated ammonium hydroxide.

7. *Ammonium polyacrylate.*—Two grams of polyacrylic acid having a specific viscosity of 8.3 (0.4% solution in water) was dissolved in 98 ml. of water containing 2.8 ml. of concentrated aqueous ammonia.

8. *Sodium polyacrylate.*—Twenty grams of the above polyacrylic acid was dissolved in 980 ml. of water containing eleven grams of sodium hydroxide.

9. *Methacrylic acid (35%) - dimethylaminoethyl methacrylate (65%)-copolymers.*—Six and one-half grams of dimethylaminoethyl methacrylate and 3.5 grams of methacrylic acid were dissolved in 90 ml. of water and 0.02 gram of potassium persulfate was added as a catalyst. The solution was heated at 60° C. overnight and then diluted to a two per cent solution for use.

10. *Acrylamide (50%)-ammonium polyacrylate (50%).*—Two grams of copolymer of acrylamide (50%)-acrylic acid (50%), having a specific viscosity (0.4% in water) of 0.46 was dissolved in 98 ml. of water containing 0.9 ml. of concentrated ammonia.

11. *Acrylamide (50%)-ammonium polymethacrylate (50%).*—Two grams of a copolymer of acrylamide (50%)-methacrylic acid (50%), having a specific viscosity (0.4% in water at pH 5.66) of 2.3, was dissolved in 98 ml. of water containing one ml. of concentrated ammonia.

12. *Alkali hydrolyzed copolymer of acrylonitrile (50%)-methacrylic acid (50%).*—A two-gram sample of a copolymer of 50 per cent acrylonitrile and 50 per cent methacrylic acid was hydrolyzed with sufficient 6 normal sodium hydroxide to neutralize the methacrylic acid and hydrolyze one-third of the acrylonitrile. After two hours unreacted alkali was neutralized with acetic acid and the solution diluted to 100 ml.

13. *Alkali hydrolyzed copolymer of acrylonitrile (50%)-methacrylic acid (50%).*—The preparation for polymer No. 12 was repeated except with sufficient sodium hydroxide to hydrolyze two-thirds of the acrylonitrile and the reaction was conducted for seven hours.

14. *Alkali hydrolyzed copolymer of acrylonitrile (50%)-methacrylic acid (50%).*—The preparation for polymer No. 12 was repeated except that 100 per cent of stoichiometric requirements of caustic soda were used with a reaction time of 13.5 hours.

15. *Acid hydrolysis of methacrylic acid (50%)-acrylonitrile (50%) copolymers.*—Two grams of a copolymer of methacrylic acid (50%) and acrylonitrile (50%) was added to a solution of 15 ml. of water and 50 ml. of concentrated sulfuric acid. After several days the thick solution was diluted with water and heated to separate a polyacid which still contained 44 per cent of the original nitrogen. Two grams of dried polymer was dissolved in 100 ml. of solution containing one ml. of 28 per cent ammonia solution.

16. *Acid hydrolysis of acrylonitrile (95%)-vinyl acetate (5%) copolymers.*—The acid hydrolysis used in the preparation of polymer No. 15 was repeated on a copolymer of 95% acrylonitrile and 5% of vinyl acetate.

17. *Acid hydrolysis of acrylonitrile (98%)-vinyl acetate (2%) copolymer.*—The acid hydrolysis used in the preparation of polymer No. 15 was repeated on a copolymer of 98% acrylonitrile and two per cent of vinyl acetate.

18. *Acid hydrolysis of acrylonitrile (80%)-methacrylonitrile (20%) copolymers.*—The acid hydrolysis used in the preparation of polymer No. 15 was repeated on a copolymer of 80 per cent of acrylonitrile and 20 per cent of methacrylonitrile.

19. *Acid hydrolysis of acrylonitrile (84%)-methacrylonitrile (11%)-vinyl acetate (5%) copolymers.*—The acid hydrolysis used in the preparation of polymer No. 15 was repeated on a copolymer of 84 per cent acrylonitrile, 11 per cent methacrylonitrile and five per cent of vinyl acetate.

20. *Acid hydrolysis of acrylonitrile (70%)-methacrylic acid (30%) copolymers.*—The acid hydrolysis used in the preparation of polymer No. 15 was repeated on a copolymer of 70 per cent acrylonitrile and 30 per cent of methacrylic acid.

21. *Acid hydrolysis of polyacrylonitrile.*—The acid hydrolysis used in the preparation of polymer No. 15 was repeated on polyacrylonitrile.

22. *Vinyl acetate-monosodium maleate.*—Two grams of a copolymer of vinyl acetate-maleic anhydride having a specific viscosity of 2.1 (one per cent in cyclohexanone) was dissolved in 100 ml. of solution containing 0.43 gram of sodium hydroxide.

23. *Vinyl acetate-diammonium maleate.*—Two grams of a copolymer of vinyl acetate-maleic anhydride having a specific viscosity of 2.1 (one per cent in cyclohexanone) was dissolved in 100 ml. of solution containing 1.45 ml. of 28 per cent ammonia solution.

24. *Vinyl acetate-maleic acid, triethanolamine salt.*—Two grams of a copolymer of vinyl acetate-maleic anhydride having a specific viscosity of 2.1 (one per cent in cyclohexanone) was dissolved in 100 ml. of solution containing 1.6 grams of triethanolamine.

25. *Vinyl acetate-maleic acid, β-dimethylaminoethyl half-ester.*—Vinyl acetate-maleic anhydride copolymer having a specific viscosity of 2.1 (one per cent in cyclohexanone) was warmed with an excess of β-dimethylaminoethanol. The half-ester was obtained as a rubbery product which when freed of β-dimethylaminoethanol was a granular solid. Two grams of this product was dissolved in 100 ml. of water.

26. *Vinyl acetate-ammonium maleamate.*—Vinyl acetate-maleic anhydride copolymer of specific viscosity 2.1 (one per cent in cyclohexanone) was dissolved in anhydrous dioxane. Anhydrous ammonia gas was passed into the solution and a precipitate separated. The dioxane was decanted and the precipitate washed with absolute ether. Two grams of this polymer was dissolved in 100 ml. of water.

27. *Vinyl acetate-N-butylmaleamic acid, butylamine salt.*—Two grams of a vinyl acetate-N-butylmaleamic acid, butylamine salt, similarly prepared from vinyl acetate-maleic anhydride copolymer was dissolved in 100 ml. of water.

28. *Vinyl alcohol-sodium maleate.*—A vinyl formate-maleic anhydride copolymer was dissolved in hot water to give a five per cent solution and a trace of hydrochloric acid added. The lactone of the vinyl alcohol-maleic acid copolymer separated a rubbery material. The lactone was dissolved in sodium hydroxide solution to give a two per cent solution of vinyl alcohol-sodium maleate.

29. *Vinyl methyl ether-ammonium maleate.*—Two grams of a copolymer of vinyl methyl ether-maleic anhydride of specific viscosity 11.8 (one per cent in cyclohexanone) was dissolved in 100 ml. of solution containing 1.7 ml. of concentrated ammonia solution.

30. *Vinyl ethyl ether-ammonium maleate.*—Two grams of a copolymer of vinyl ethyl ether-maleic anhydride of specific viscosity 2.1 (one per cent in cyclohexanone) was dissolved in 100 ml. of a solution containing 1.5 ml. of concentrated ammonia solution.

31. *Isobutylene - ammonium maleate.* — Two grams of a copolymer of isobutylene-maleic anhydride of specific viscosity of 0.83 (0.2 per cent in dimethylformamide) was dissolved in 100 ml. of a solution containing 1.7 ml. of concentrated ammonia solution.

32. *Styrene-ammonium maleate.*—Two grams of styrene-maleic anhydride copolymer was dissolved in 100 ml. of a solution containing 1.3 ml. of concentrated ammonia solution.

33. *Styrene-maleic acid, β-dimethylaminoethyl half-ester.*—Styrene-maleic anhydride copolymer was warmed with an excess of β-dimethylaminoethanol. A spongy mass formed from which excess alcohol was removed by squeezing and by washing with absolute ether. Two grams of air-dried polymer was dissolved in 100 ml. of water.

34. *Ethyl acrylate-ammonium maleate.*—Two grams of a copolymer of ethyl acrylate-maleic anhydride was dissolved in 100 ml. of solution containing 1.3 ml. of concentrated ammonia solution.

35. *Vinyl acetate-maleic acid-½ calcium salt.*—Two grams of a copolymer of maleic anhydride and vinyl acetate and 0.4 gram of calcium hydroxide were added to 100 ml. of water and agitated until solution was complete.

36. *Vinyl acetate-diammonium maleate.*—Two grams of a copolymer of vinyl acetate-maleic anhydride having a specific viscosity of 3.1 (one per cent in cyclohexanone) was dissolved in 100 ml. of solution containing 1.45 ml. of 28 per cent ammonia solution.

37. *Vinyl acetate-diammonium maleate.*—Two grams of a copolymer of vinyl acetate-maleic anhydride having a specific viscosity of 4.75 (one per cent in cyclohexanone) was dissolved in 100 ml. of solution containing 1.45 ml. of 28 per cent ammonia solution.

38. *Vinyl methyl ether-ammonium maleate.*—Two grams of a copolymer of vinyl methyl ether-maleic anhydride of specific viscosity 13.8 (one per cent in cyclohexanone) was dissolved in 100 ml. of solution containing 1.7 ml. of 28 per cent ammonia solution.

39. *Vinyl ethyl ether-ammonium maleate.*—Two grams of a copolymer of vinyl ethyl ether-maleic anhydride of specific viscosity 17.5 (one per cent in cyclohexanone) was dissolved in 100 ml. of solution containing 1.55 ml. of 28 per cent ammonia solution.

40. *Isopropenyl acetate-diammonium maleate.*—Two grams of a copolymer of isopropenyl acetate-maleic anhydride having a specific viscosity of 19.3 (one per cent in cyclohexanone) was dissolved in 100 ml. of solution containing 1.35 ml. of 28 per cent ammonia solution.

41. *Vinyl isopropyl ether-ammonium maleate.*—Two grams of a copolymer of vinyl isopropyl ether-maleic anhydride having a specific viscosity of 1.98 (one per cent in cyclohexanone) was dissolved in 100 ml. of solution containing 1.45 ml. of 28 per cent ammonia solution.

42. *Vinyl n-butyl ether-ammonium maleate.*—Two grams of a copolymer of vinyl n-butyl ether-maleic anhydride having a specific viscosity of 3.07 (one per cent in cyclohexanone) was dissolved in 100 ml. of solution containing 1.4 ml. of 28 per cent ammonia solution.

43. Two grams of a copolymer of vinyl chloride-maleic anhydride having a specific viscosity of 0.95 (one per cent in cyclohexanone) was dissolved in 100 ml. of solution containing 1.6 ml. of 28 per cent ammonium solution.

44. *Vinyl chloroacetate-diammonium maleate.*—Two grams of a copolymer of vinyl chloroacetate-maleic anhydride having a specific viscosity of 16.2 (one per cent in cyclohexanone) was dissolved in 100 ml. of a solution containing 1.3 ml. of 28 per cent ammonia solution.

45. *Vinyl acetate-maleic acid, partial methyl ester, ammonium salt.*—Two grams of a terpolymer of vinyl acetate (one mole), monomethyl maleate (0.08 mole) and maleic anhydride (0.92 mole) having a specific viscosity of 10.3 (one per cent in cyclohexanone) was dissolved in 100 ml. of solution containing 1.25 mole of 28 per cent ammonia solution.

46. *Vinyl methyl ether-maleic acid, half calcium salt.*—Two grams of a copolymer of vinyl methyl ether-maleic anhydride having a specific viscosity of 11.8 (one per cent in cyclohexanone) 0.3 ml. of water and 0.4 gram of calcium hydroxide were blended together intimately. The product was water-soluble and contained 74 per cent polymer.

47. Polyacrylonitrile was hydrolyzed in a mixture of water and ethanol using approximately the stoichiometric proportion of water and sufficient alcohol to keep the polymer in fluid suspension. After heating about eight hours at the reflux temperature the finely divided hydrolyzed product was recovered in a dense anhydrous form.

48. The procedure for preparing polymer No. 47 was used to prepare the corresponding potassium salt.

49. The procedure of polymer No. 47 was repeated using isopropanol as the reaction medium. The sodium salt was recovered by direct filtration of the reaction medium.

50. *Partial ester of maleic anhydride-vinyl acetate copolymer.*—Maleic anhydride was esterified with 0.45 mole of methyl alcohol and then copolymerized with an equimolar proportion of vinyl acetate.

51. *Partial calcium salt of the partial ester of maleic anhydride-vinyl acetate copolymer.*—The composition of polymer No. 50 was mixed with 30 mole per cent of hydrated lime and ball-milled.

52. *Polyvinyl 2-chloroethyl ether.*—Vinyl 2-chloroethyl ether was polymerized in liquid propane containing crushed Dry Ice using boron trifluoride catalyst. The polymer was isolated and purified by precipitation and dried (specific viscosity on one per cent benzene solution equals 1.00). The polymer was dissolved in dimethylformamide and trimethylamine added and the solution heated. The resulting water-soluble polymer, containing quaternary ammonium salt groups as part of the polymer molecule, was isolated by precipitation in ether.

53. *Vinyl 2-chloroethyl ether-maleic anhydride copolymer.*—A copolymer of vinyl 2-chloroethyl ether and maleic anhydride was prepared by copolymerizing equal molecular proportions of the two monomers using a peroxide catalyst. The resulting polymer was converted to the sodium salt for tests in soil.

54. *Vinyl acetate and methacrylic acid copolymer.*—A copolymer of vinyl acetate and methacrylic acid was prepared by suspension polymerization. Analysis showed the copolymer contained methacrylic acid units amounting to 38 per cent by weight. This polymer was converted to the water-soluble ammonium salt for testing in soil.

55. *Acrylonitrile-methacrylic acid copolymer.*—A polymer obtained by copolymerization of acrylonitrile and methacrylic acid was shown by analysis to contain 64 per cent by weight of methacrylic acid residues. The ammonium salt of this polymer was used for soil tests.

56. *Styrene-methacrylic acid copolymer.*—A copolymer of styrene and methacrylic acid was prepared using a peroxide catalyst. Filtration of the polymer gave a neutralization equivalent corresponding to 76 per cent by weight methacrylic acid. The polymer was converted to the ammonium salt and tested for soil aggregate stabilizing effect.

57. *Polyvinyl hydrogen phthalate.*—Polyvinyl hydrogen phthalate was dissolved in dilute aqueous ammonia to yield a solution of the ammonium salt of this polymer. This solution was used for tests with soil.

58. *Styrene-itaconic anhydride copolymer.*—A styrene and itaconic anhydride copolymer was prepared in ethylene dichloride using 2,4-dichlorobenzoyl peroxide catalyst. This was converted to the ammonium salt by dissolving in dilute aqueous ammonia. This solution was used for aggregation tests on soil.

59. *Sulfonated polystyrene.*—Polystyrene of about 65,000 molecular weight was sulfonated in ethylene dichloride solution using as the sulfonating agent a 2:1 complex of bis-$\beta$-chloro-ethyl ether and sulfur trioxide. After isolation the sulfonated polystyrene gave a neutral equivalent of 220, corresponding to an average of 0.75 sulfonic groups per phenyl group. This polymer was converted to the sodium salt for use in soils.

60. *Vinyl acetate-monomethylmaleate copolymer.*—Vinyl acetate was copolymerized with monomethyl maleate in an emulsion system to yield a polymer which analysis showed contained 7.5 per cent by weight monomethyl maleate groups. This polymer was soluble in dilute alkali and was used in the form of its sodium salt.

61. *Vinyl acetate-itaconic anhydride copolymer.*—Vinyl acetate and itaconic anhydride were copolymerized in a "solvent-non-solvent" type polymerization using ethylene dichloride solvent. The vinyl acetate and itaconic anhydride were charged in a weight ratio of 0.77:1. The resulting polymer was shown by analysis to contain about 37 per cent by weight vinyl acetate units. The polymer was used in soils in the form of its ammonium salt.

These polymers are all useful in practicing the invention, and are all polyelectrolytes which ionize in aqueous dispersions. When in contact with water some are readily dissolved to form clear, viscous solutions. Others are not completely soluble, but are expanded by the water, some fragments being dispersed colloidally or molecularly in the water to a sufficient extent for inducing aggregation. Some of the water-soluble polymers may be apparently unaffected by distilled water, but soil water, with acidic or basic solute, may be an adequate solvent to the extent required for effective practice of the invention. Where solubility is minimum a longer period of time may be required for complete aggregation.

EXAMPLE 2

Field soils were air-dried, pulverized and screened to pass a one mm. sieve. To 100 gram portions of the soil was added 30 ml. of solution containing known amounts of various polymers and the soil mixed well. This volume of solution of the less effective polymers was sufficient to make the soil sticky. Some of the polymers gave a more marked improvement in physical properties and up to ten ml. more of water was necessary to make the soil sticky. The wet soil was broken up, allowed to dry in air and then broken up further to pass a four mm. sieve and the crumbs of 2–4 mm. size were collected. Four grams of these crumbs were used in each flask for evaluation in the Warburg apparatus according to the technique of Webley, Quastel et al., Journal Agricultural Science 37, 257 (1947), with the exception that a 1.5 per cent suspension of Fleischmann's dry yeast was substituted for the organism used by them. The results on an alluvial sandy loam or Miami silt loam is given in Table I.

The aeration factor measured by the Warburg apparatus should be as high as possible in the presence of the maximum water content. All soils become water-logged if enough water is added and untreated soils to which 62.5 per cent water has been added are saturated with water which prevents access of air. In this condition the aeration factor of the soil cannot be measured an dthe result is indicated in the table as "__." Some soils become saturated at 50 per cent added water. As the water content of soils increases the aeration factor gradually drops until the soil becomes "water-logged" and further growth of the yeast stops.

Table I

| Soil type | Polymer number | Polymer conc., percent | Aeration factor—Amount of added water | | | |
|---|---|---|---|---|---|---|
| | | | 25% | 37.5% | 50% | 62.5% |
| Miami silt loam | None | 0 | 105 | 90 | 35 | |
| Do | 1 | .1 | 101 | 100 | 82 | 47 |
| Do | 1 | .02 | 94 | 94 | 69 | |
| Do | 2 | .1 | 106 | 103 | 85 | 54 |
| Do | 2 | .05 | 116 | 102 | 74 | 53 |
| Do | 2 | .02 | 109 | 88 | 58 | |
| Do | 3 | .1 | 116 | 103 | 61 | 13 |
| Do | 4 | .2 | 117 | 102 | 75 | 47 |
| Do | 6 | .1 | 122 | 119 | 80 | 19 |
| Do | 7 | .1 | 112 | 100 | 69 | |
| Do | 10 | .1 | 119 | 112 | 70 | 26 |
| Do | 11 | .1 | 112 | 110 | 66 | |
| Alluvial sandy loam | None | 0 | 83 | 55 | | |
| Miami silt loam | 23 | .1 | 106 | 86 | 45 | 14 |
| Do | 23 | .02 | 102 | 100 | 57 | |
| Do | 24 | .1 | 119 | 113 | 81 | 42 |
| Do | 25 | .1 | 110 | 104 | 78 | 46 |
| Do | 26 | .1 | 116 | 111 | 63 | |
| Alluvial sandy loam | 27 | 1.0 | 66 | 64 | 42 | 30 |
| Do | 28 | 1.0 | 108 | 97 | 47 | 23 |
| Miami silt loam | 29 | .1 | 119 | 110 | 69 | 41 |
| Do | 30 | .1 | 119 | 98 | 50 | |
| Do | 31 | .1 | 120 | 104 | 36 | |
| Do | 32 | .1 | 101 | 79 | 72 | 81 |
| Do | 33 | .1 | 115 | 99 | 65 | 36 |
| Do | 34 | .1 | 117 | 80 | 30 | |

Several other polymers not included within the scope of this application and other soil structure modifying agents were screened by the Warburg technique and found to develop moderate improvement in the crumb structure of the soil. These crumbs were stable to water percolation for three to fifteen days. However, soils aggregated with polymers Nos. 22 and 23 have been subjected to the same percolation test for 32 months and have shown no evidence of deterioration in optimum structure. The following Table II sets forth the observed Warburg data:

Table II

| Soil type | Polymer used | Polymer conc., percent | Aeration factor—amount of added water | | | |
|---|---|---|---|---|---|---|
| | | | 25% | 37.5% | 50% | 62.5% |
| Alluvial sandy loam | Sodium alginate | 0.1 | 118 | 85 | 28 | |
| Miami silt loam | "Methocel 50"[1] | .1 | 116 | 96 | 65 | |
| Do | "Methocel 1500"[1] | .1 | 126 | 102 | 61 | |
| Do | Compost | 3.0 | 99 | 85 | 34 | |
| Do | do | 1.0 | 82 | 79 | 20 | |

[1] Commercially available cellulose methyl ether.

A number of different soils have been treated with one of the soil-conditioning agents to demonstrate that the effect is not limited to the soil types illustrated in Table I. The effect of polymer No. 23 on the aeration factor of a number of soils is given in Table III.

Table III

| Soil type | Conc. of polymer, percent | Amount of added water | | | |
|---|---|---|---|---|---|
| | | 25% | 37.5% | 50% | 62.5% |
| Alluvial sandy loam (Ohio) | 0 | 83 | 55 | | |
| Do | .1 | 128 | 92 | 66 | 40 |
| Miami silt loam (Ohio) | 0 | 105 | 90 | 35 | |
| Do | .1 | 106 | 86 | 45 | 14 |
| Gumbo soil (Illinois) | 0 | 103 | 80 | 44 | |
| Do | .1 | 123 | 113 | 66 | 32 |
| Paulding clay (Ohio) | 0 | 94 | 92 | 64 | |
| Do | .1 | 105 | 102 | 85 | 57 |
| Grenada silt loam (Tenn.) | 0 | 83 | 69 | 46 | |
| Do | .1 | 99 | 103 | 99 | 76 |
| Memphis silt loam (Tenn.) | 0 | 92 | 80 | 56 | |
| Do | .1 | 104 | 100 | 82 | 51 |

EXAMPLE 3

The effect of the polymers on the percentage of water stable aggregates was determined by the following procedure. To 100 grams of Miami silt loam pulverized to pass a 0.25 mm. sieve, was added 30 ml. of distilled water containing the appropriate amount of the polymer. The soil was well mixed and pressed through a 4-mm. sieve. After drying for at least two days in a warm room at low humidity, air at 50° C. was blown on the soil for ten minutes to complete the drying. Forty-gram samples were placed on the top sieve of a set of three sieves, 0.84 mm., 0.42 mm. and 0.25 mm. arranged in order of decreasing size. The sieves were raised and lowered in water through a distance of 1.5 inches at the rate of thirty cycles per minute for thirty minutes. At the end of that time the sieves were raised, allowed to drain, the soil dried at 80° C. and weighed. The results are reported in Table IV, as the per cent of water stable aggregates larger than 0.25 mm. Miami silt loam without the addition of polymer gave almost no water stable aggregates.

Table IV

PERCENT OF WATER-STABLE AGGREGATES >0.25 MM. IN MIAMI SILT LOAM AFTER TREATMENT WITH POLYMERS

| Polymer | Percent polymer on soil | | | | |
|---|---|---|---|---|---|
| | 0.005 | 0.01 | 0.02 | 0.05 | 0.1 |
| None | | | | | |
| No. 1 | | 11.7 | | | 70.8 |
| No. 2 | | | | | 53.0 |
| No. 3 | | | 39.3 | | 97.3 |
| No. 6 | | 4.5 | | | 70.7 |
| No. 9 | | | 3.0 | | 23.0 |
| No. 10 | | 3.5 | | | 80.8 |
| No. 12 | | 19.8 | | | 95.3 |
| No. 13 | | 9.5 | | | 93.5 |
| No. 14 | | 8.5 | | | 91.3 |
| No. 15 | | 29.8 | | | 93.8 |
| No. 16 | | 15.5 | | | 97.0 |
| No. 17 | | 18.3 | | | 92.5 |
| No. 18 | | 4.3 | | | 62.0 |
| No. 19 | | 25.5 | | | 82.3 |
| No. 20 | | 6.5 | | | 73.3 |
| No. 21 | | 11.8 | | | 92.0 |
| No. 23 | 3.0 | 7.8 | 45.0 | 90.7 | 95.5 |
| No. 24 | | 7.3 | | | 93.8 |
| No. 25 | | 2.8 | | | 79.3 |
| No. 26 | | 4.0 | | | 90.5 |
| No. 27 | | 1.5 | | | 89.8 |
| No. 28 | | 0.8 | | | 41.2 |
| No. 29 | 5.6 | 38.5 | | | 95.1 |
| No. 30 | | 15.8 | | | 93.8 |
| No. 31 | | 13.3 | | | 91.8 |
| No. 32 | | 8.7 | | | 96.2 |
| No. 33 | | 3.7 | | | 78.0 |
| No. 34 | | 1.0 | | | 95.7 |
| No. 35 | | 26.5 | | | 93.7 |
| No. 36 | | 24.8 | | | 94.0 |
| No. 37 | | 31.8 | | | 98.0 |
| No. 38 | | 44.8 | | | 90.8 |
| No. 39 | | 42.8 | | | 97.3 |
| No. 40 | | 40.8 | | | 99.8 |
| No. 41 | | 3.3 | | | 96.8 |
| No. 42 | | 19.8 | | | 97.0 |
| No. 43 | | 3.8 | | | 63.3 |
| No. 44 | | 13.8 | | | 94.5 |
| No. 45 | | 30.3 | | | 95.0 |
| No. 46 | | 5.3 | | | 96.6 |
| No. 47 | | | | 47 | 97 |
| No. 48 | | | | 48 | |
| No. 49 | | | | 41.0 | 66.5 |
| No. 50 | | | 27 | 52 | |
| No. 51 | | 33.5 | 67 | | 96 |
| No. 52 | | | | | 92.5 |
| No. 53 | | | | | 43 |
| No. 54 | | | | | 91 |
| No. 55 | | | | | 44 |
| No. 56 | | | | | 75 |
| No. 57 | | | | | 81 |
| No. 58 | | | | | 75 |
| No. 59 | | | | | 85 |
| No. 60 | | | | | 62 |
| No. 61 | | | | | 60 |
| | | | | | 75.5 |

The water-stability of soil aggregates is a useful property of a soil, which has a direct relationship with the fertility of the soil and the ease of cultivation. The property is manifested by mixing the polyelectrolyte with the soil either alone or in admixture with a carrier or diluent. This carrier may be a substance having an independent beneficial effect on the soil, or it may be one which has a cooperative or synergistic effect with the polymer. The diluents may be plant nutrients for use in general agricultural work. When the soil conditioner is to be used for erosion control in areas where vegetation is not desired the additive may be a herbicide. Finely divided granular substances, such as clay, sand, crushed stone, gypsum, silt, talc, gravel or other non-nutrient soil component, may be added to facilitate spreading operations and to prevent caking by reason of the hygroscopic properties of some of the polyelectrolytes. These inert diluents provide the various functions without inhibiting the aggregative effect of the polymers and in some instances provide improved aggregation.

The crumb stabilities of Miami silt loam soils when treated with other polymeric compositions, not included within the scope of this invention, were tested by the identical procedure. The following Table No. V sets forth the observed values.

Table V

PERCENT OF WATER-STABLE AGGREGATES >0.25 MM. IN MIAMI SILT LOAM AFTER TREATMENT WITH POLYMERS

| Polymer | Percent polymer on soil | | | | |
|---|---|---|---|---|---|
| | 0.005 | 0.01 | 0.02 | 0.05 | 0.1 |
| "Carbowax 6000" [1] | | 0.3 | | | 0.3 |
| Polyvinyl methyl ether | | .3 | | | .3 |
| "Urea-form" | | .3 | | | .4 |
| "Methocel 50" | | .5 | | | 15.5 |
| "Methocel 1500" [2] | | .5 | | | 13.3 |
| Sodium alginate | | .3 | | | 41.3 |

[1] Polyethylene oxide.
[2] Cellulose methyl ether.

EXAMPLE 4

The moisture equivalent was determined by the method of Bouyoucos as described in Soil Science 40, 165-171 (1935). Samples of soil treated with various polymers were put through a two-mm. sieve when dry. Büchner funnels 5 cm. in diameter and 2.5 cm. deep were filled level full with soil and placed in a beaker of water to soak for 24 hours. The funnel was then placed in a suction flask connected to an aspirator and left there for fifteen minutes after free water disappeared from the top of the soil. The moist soil was placed in a tared weighing bottle and the moisture content determined by measuring the loss in weight upon heating at 105° C. All moisture equivalent determinations were run in duplicate.

Wilting points of soil treated with various polymers were determined by the method of Breazeale and McGeorge as published in Soil Science 68, 371-374 (1949). Twenty to thirty grams of soil was jacketed around the stem of a tomato plant by means of a glass tube three cm. in diameter and five cm. long. The ends were stoppered with halves of corks and sealed with beeswax-paraffin mixture. After a few weeks, roots appeared in the enclosed soil. The soil samples were left for six to eight weeks longer for the soil to arrive at the wilting point, then removed and the moisture content determined. Duplicates were determined in each instance.

Table VI

EFFECT OF VARIOUS POLYMERS ON THE MOISTURE EQUIVALENT, WILTING POINT AND MOISTURE AVAILABLE FOR PLANTS IN MIAMI SILT LOAM

| Polymer number | Percent polymer on soil | Moisture equivalent | Wilting point | Percent increase available moisture over control |
|---|---|---|---|---|
| Control | 0 | 24.2 | 7.6 | |
| No. 1 | 0.1 | 26.1 | 9.1 | 2.4 |
| No. 3 | .1 | 31.2 | 9.6 | 30.1 |
| No. 3 | .05 | 28.1 | | |
| No. 3 | .02 | 25.0 | | |
| No. 6 | .1 | 26.3 | 8.0 | 12.0 |
| No. 6 | .05 | 27.4 | | |
| No. 6 | .02 | 25.1 | | |
| No. 7 | .1 | 25.7 | 8.9 | 1.2 |
| No. 23 | .1 | 27.6 | 7.8 | 19.3 |
| No. 23 | .05 | 27.6 | | |
| No. 23 | .02 | 24.0 | | |
| No. 29 | .1 | 29.0 | 8.3 | 24.7 |
| No. 29 | .05 | 26.7 | | |
| No. 29 | .02 | 26.2 | | |
| No. 36 | .1 | 27.5 | 8.6 | 13.9 |
| No. 36 | .05 | 26.5 | | |
| No. 36 | .02 | 25.1 | | |
| No. 40 | .1 | 29.4 | 8.6 | 25.3 |
| No. 40 | .05 | 29.7 | | |
| No. 40 | .02 | 26.9 | | |

EXAMPLE 5

Miami silt loam was treated with various materials, the moisture content of each sample adjusted to about 23 per cent and about four pounds of each placed in a two-liter beaker. These beakers were kept in a greenhouse and weighed every one or two days to follow the rate of evaporation of water from the surface. The results are reported in Table VII.

Table VII
EFFECT OF VARIOUS MATERIALS ON SOIL MOISTURE LOST BY SURFACE EVAPORATION IN 15 DAYS

| Treatment | Percent polymer on soil | Percent original moisture lost in 15 days | Percent reduction in evaporation over control |
|---|---|---|---|
| Control | 0 | 40.7 | 0 |
| Polymer No. 22 | .1 | 27.1 | 33.4 |
| Do | .05 | 35.4 | 13.0 |
| Polymer No. 23 | .1 | 26.7 | 34.4 |
| Do | .05 | 33.0 | 17.4 |
| Equal moisture of "Methocel 50" and "Methocel 1500" | .1 | 35.7 | 12.3 |

EXAMPLE 6

The effect of treatment of a woods soil of good structure with 0.1 per cent of various polymeric polyelectrolytes was determined as follows. Thirty grams of crumbs of the soil were placed in a modification of the perfusion apparatus described by Lees and Quastel, Biochemical Journal 40, 803–815 (1946) and a solution of M/30 ammonium sulfate cycled through the soil continuously so as to keep the soil wet. From time to time a sample of the solution was removed and analyzed for nitrate by a colorimetric procedure. Table VIII reports the concentration nitrate found at various intervals.

Table VIII
RATE OF NITRIFICATION IN A GOOD WOODS SOIL AS AFFECTED BY 0.1 PERCENT OF VARIOUS POLYMERIC POLYELECTROLYTES

| Treatment | Concentration of $NO_3-$ (p. p. m.) at various time intervals—Days | | | | |
|---|---|---|---|---|---|
|  | 0 | 2 | 5 | 9 | 13 |
| Control | 3 | 5 | 8 | 25 | 60 |
| Sodium salt of methyl vinyl ether-Maleic acid copolymer | 3 | 5 | 8 | 26 | 62 |
| Sodium polymethacrylate | 3 | 5 | 9 | 31 | 76 |
| Polyacrylamide | 3 | 5 | 9 | 39 | 100 |

EXAMPLE 7

The effect of improved soil structure was obtained by adding the various polymeric polyelectrolytes in accordance with the practice of this invention. Radishes, carrots and kidney beans were grown in a greenhouse under controlled conditions. The Tables IX, X, XI, and XII demonstrate the observed improvements in yields.

Table IX
GROWTH OF RADISHES IN MIAMI SILT LOAM CONTAINING STRUCTURE IMPROVING ADDITIVES

| Treatment | Percent germination | Yield of radishes (g.) | Yield improvement factor | Average weight radish (g.) | Size improvement factor |
|---|---|---|---|---|---|
| Control | 79 | 19 |  | 0.35 |  |
| No. 8 (0.1%) | 93 | 93 | 4.9 | 1.43 | 4.1 |
| No. 8 (0.02%) | 89 | 78 | 4.1 | 1.26 | 3.6 |
| No. 5 (0.1%) | 84 | 124 | 6.5 | 2.18 | 6.2 |
| No. 5 (0.02%) | 90 | 83 | 4.4 | 1.32 | 3.8 |
| No. 2 (0.1%) | 94 | 57 | 3.0 | .86 | 2.5 |
| No. 2 (0.02%) | 81 | 73 | 3.8 | 1.28 | 3.7 |

Table X
GROWTH OF RADISHES IN MIAMI SILT LOAM CONTAINING STRUCTURE IMPROVING ADDITIVES

| Treatment | Percent polymer added | Percent germination | Yield improvement factor | Size improvement factor |
|---|---|---|---|---|
| Control | 0 | 71 |  |  |
| No. 22 | .1 | 83 | 2.6 | 2.2 |
| No. 22 | .02 | 88 | 2.7 | 2.2 |
| No. 23 | .1 | 88 | 4.8 | 3.8 |
| No. 23 | .02 | 92 | 2.2 | 1.6 |

Table XI
GROWTH OF CARROTS IN MIAMI SILT LOAM CONTAINING STRUCTURE IMPROVING ADDITIVES

| Treatment | Percent polymer added | Percent germination | Yield improvement factor | Size improvement factor |
|---|---|---|---|---|
| Control | 0 | 33 |  |  |
| No. 22 | .1 | 67 | 8.0 | 3.9 |
| No. 22 | .02 | 21 | 5.0 | 7.8 |
| No. 23 | .1 | 46 | 8.1 | 5.8 |
| No. 23 | .02 | 58 | 6.6 | 3.7 |

Table XII
EFFECT OF SOIL TREATMENT UPON PERCENT GERMINATION OF CARROTS AND BEANS IN MIAMI SILT LOAM

| Treatment | Percent polymer added | Crop grown | Number of hills planted | Percent germination |
|---|---|---|---|---|
| Control | 0 | Carrots | 120 | 32 |
| No. 22 | .05 | do | 88 | 63 |
| Control | 0 | Kidney beans | 60 | 25 |
| No. 22 | .1 | do | 60 | 48 |
| No. 22 | .02 | do | 60 | 47 |

EXAMPLE 8

Growing experiments were conducted under uniform conditions utilizing sodium alginate and methyl cellulose, the polymers used by the prior art for improving soil structure. The following table sets forth the effect of the addition on the yields.

Table XIII

| Treatment | Total yield (g.) | Yield improvement factor | Average weight/ radish (g.) | Weight improvement factor |
|---|---|---|---|---|
| None | 31 |  | 0.53 |  |
| Sodium alginate | 19 | 0.6 | .30 | 0.6 |
| Methyl cellulose | 34 | 1.1 | .60 | 1.1 |

The data set forth in the various tables of Examples 7 and 8 demonstrate that the various polymeric polyelectrolytes have quite different effects on the soil structure as it affects the development of plants as compared to sodium alginate and methyl cellulose which are not included within the scope of the invention as defined.

EXAMPLE 9

Carrots were grown in a greenhouse bench in Miami silt loam, part of which was treated with 0.05 per cent of polymer No. 22. Table XIV shows the pronounced effect of treatment of the soil upon the growth of the carrots.

Table XIV
GROWTH OF CARROTS IN MIAMI SILT LOAM CONTAINING POLYMER NO. 22

| Treatment | Percent germination | Total yield (g.) | Yield improvement factor | Average weight/ carrot (g.) | Weight improvement factor |
|---|---|---|---|---|---|
| Control | 72 | 181 |  | 3.1 |  |
| 0.05% polymer No. 22 | 68 | 543 | 3.0 | 8.6 | 2.8 |

EXAMPLE 10

A sloping hillside which had little vegetation and which was eroding badly was chosen. An area near the bottom of the slope was leveled by means of garden implements, leaving all gullies filled. Polymer No. 35 in the form of a dry powder was sprinkled on one half of the area at the rate of two pounds per 100 square feet and raked into the surface. After one month the gullies in the untreated section were being recut while no evidence of erosion was to be found in the half treated with polymer No. 35.

EXAMPLE 11

To determine the effect of the soil conditioners and the methods of application on crop yield, large scale field tests were conducted on corn using polymer No. 35 as the conditioning agent.

Table XV

| Treatment | Polymer quantity | Yield, bushels/acre |
|---|---|---|
| Control | | 37.2 |
| Broadcast on plowed ground and disked | 0.02 | 50.7 |
| Top dressed before first cultivation | .02 | 40.4 |
| Broadcast on plowed ground rototilled | .02 | 48.9 |
| Broadcast on plowed ground and disked | .1 | 53.8 |
| Top dressed before first cultivation | .1 | 42.2 |
| Broadcast on plowed ground rototilled | .1 | 50.2 |

These data demonstrate yield improvements by all methods of conditioning. The lower yields obtained when the polymer is added at time of first cultivation are undoubtedly the result of the limited surface treatment.

EXAMPLE 12

Large scale field tests were conducted on oats comparing mixing by rototilling and addition by top dressing. The following Table XVI demonstrates the yields in pounds per acre.

Table XVI

| Treatment | No. 35 polymer quantity | Yield |
|---|---|---|
| Control | 0 | 5,277 |
| Rototilled | .05 | 7,774 |
| Top dressed | .05 | 6,035 |

This application is a continuation-in-part of application, Serial No. 148,521, filed March 8, 1950, by Ross M. Hedrick and David T. Mowry, and application, Serial No. 148,522, filed March 8, 1950, by David T. Mowry and Ross M. Hedrick.

What we claim is:

1. The method of improving the tilth of surface soils normally subject to slaking or erosion, which comprises incorporating in the soil in the presence of soil moisture from 0.001 to 2.0 per cent based in said soil of a synthetic water-soluble polyelectrolyte having a weight average molecular weight of at least 10,000 and having a structure derived by the polymerization of at least one monoolefinic compound through the aliphatic unsaturated group, said structure being substantially free of cross-linking.

2. The method of improving the tilth of surface soils normally subject to slaking or erosion, which comprises incorporating in the soil in the presence of soil moisture from 0.001 to 2.0 per cent based on said soil of a synthetic water-soluble polyelectrolyte having a weight average molecular weight of at least 10,000, and being a copolymer of a compound containing the molecular grouping:

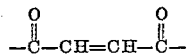

and at least one other monoolefinic monomer.

3. The method of improving the tilth of surface soils normally subject to slaking or erosion, which comprises incorporating in the soil in the presence of soil moisture from 0.001 to 2.0 per cent based on said soil of a synthetic water-soluble polyelectrolyte having a weight average molecular weight of at least 10,000, and being a polymer of a compound containing the molecular grouping:

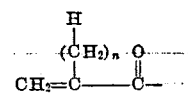

wherein $n$ is an integer from zero (0) to one (1) inclusive.

4. The method defined by claim 1, wherein the polyelectrolyte is a calcium salt of a hydrolyzed polymer of acrylonitrile.

5. The method defined by claim 1, wherein the polyelectrolyte is a sodium salt of a hydrolyzed polymer of acrylonitrile.

6. The method defined by claim 1, wherein the polyelectrolyte is a copolymer having the structure of a copolymer of vinyl acetate and the reaction product formed by partially esterifying maleic anhydride with methyl alcohol.

7. The method defined by claim 1, wherein the polyelectrolyte is a copolymer having the structure of an ammonium salt of a copolymer of isobutylene and maleic acid.

8. The method of treating tillable surface soils for increasing the water-stability of aggregates therein, which comprises contacting the soil in the presence of soil moisture with a small amount, not to exceed 0.2 per cent by weight of the soil, of a synthetic polymeric water-soluble polyelectrolyte having an average molecular weight greater than 15,000, and having a structure derived by the polymerization of at least one monoolefinic compound through the aliphatic unsaturated group.

9. The method of treating tillable surface soils for increasing the water-stability of aggregates therein, which comprises contacting the soil in the presence of soil moisture with a small amount, not to exceed 0.2 percent by weight of the soil, of a synthetic polymeric water-soluble polyelectrolyte having an average molecular weight greater than 15,000, and being a copolymer of a compound containing the molecular grouping:

and at least one other monoolefinic monomer.

10. The method of treating tillable surface soils for increasing the water-stability of aggregates therein, which comprises contacting the soil in the presence of soil moisture with a small amount, not to exceed 0.2 per cent by weight of the soil, of a synthetic polymeric water-soluble polyelectrolyte having an average molecular weight greater than 15,000, and being a polymer of a compound containing the molecular grouping:

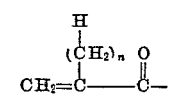

wherein $n$ is an integer from zero (0) to one (1), inclusive, said polyelectrolyte having a structure substantially free of cross-linking.

11. The method of treating tillable surface soils for improving the aeration and water retention thereof which comprises incorporating in the soil from 0.001 to 2.0 per cent by weight of a high molecular weight synthetic polymer containing a substantially linear molecular chain derived by the polymerization of at least one monoolefinic compound through aliphatic unsaturation, said molecular chain having a number of ionizable substituents such as to render the polymer water-soluble.

12. The method of treating tillable surface soils for improving the aeration and water retention thereof which comprises incorporating in the soil from 0.001 to 2.0 per cent by weight of a high molecular weight synthetic polymer containing a substantially linear molecular chain derived by the polymerization of at least one monoolefinic compound through aliphatic unsaturation, said molecular chain having a number of ionizable substituents such as to render the polymer water-soluble, said polymer being a copolymer of a compound containing the molecular grouping:

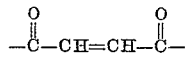

and at least one other monoolefinic monomer.

13. The method of treating tillable surface soils for improving the aeration and water retention thereof which comprises incorporating in the soil from 0.001 to 2.0 per cent by weight of a high molecular weight synthetic polymer containing a substantially linear molecular chain derived by the polymerization of at least one monoolefinic compound through aliphatic unsaturation, said molecular chain having a number of ionizable substituents such as to render the polymer water-soluble, said polymer being a polymer of a compound containing the molecular grouping:

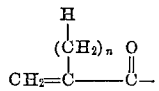

wherein $n$ is an integer from zero (0) to one (1), inclusive.

14. The method of improving the tilth of a surface soil normally subject to slaking or erosion which comprises applying to the soil a small amount, not to exceed 0.2 per cent by weight based on the weight of the soil to the depth of cultivation, of a synthetic water-soluble polyelectrolyte having a structure derived by polymerization of at least one compound characterized by the presence of a single aliphatic carbon to carbon unsaturated group, and having a molecular weight such as to improve the water-stability of aggregates in the said soil.

15. The method of improving the tilth of a surface soil normally subject to slaking or erosion which comprises applying to the soil a small amount, not to exceed 0.2 per cent by weight, of a synthetic water-soluble polyelectrolyte having a molecular weight such as to improve the water-stability of aggregates in the said soil, said polymer being a copolymer of a compound containing the molecular grouping:

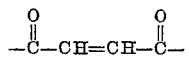

and at least one other monoolefinic monomer.

16. The method of improving the tilth of a surface soil normally subject to slaking or erosion which comprises applying to the soil a small amount, not to exceed 0.2 per cent by weight, of a synthetic water-soluble polyelectrolyte having a molecular weight such as to improve the water-stability of aggregates in the said soil, said polymer being a polymer of a compound containing the molecular grouping:

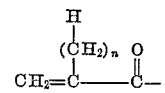

wherein $n$ is an integer from zero (0) to one (1) inclusive.

17. The method of improving the tilth of a surface soil normally subject to slaking or erosion which comprises applying to the soil a small amount, not to exceed 0.2 per cent by weight based on the weight of the soil to the depth of cultivation, of a copolymer of a monoolefinic dicarboxylic acid anhydride and at least one other monoolefinic monomer, and having a weight average molecular weight such that it will in the presence of soil moisture improve the water-stability of the soil aggregates.

18. The method defined by claim 17, wherein the copolymer is a copolymer of vinyl acetate and maleic anhydride.

19. The method of treating tillable surface soils and increasing the water-stability of aggregates therein, which comprises incorporating in the soil a small amount, not to exceed 0.2 per cent by weight of a synthetic polymer having a weight average molecular weight of at least 15,000, said polymer being selected from a class consisting of: polymers of acrylic acid, salts of polymers of acrylic acid, salts of hydrolyzed polymers of acrylonitrile, hydrolyzed polymers of acrylonitrile, polymers of methacrylic acid, salts of polymers of methacrylic acid, salts of hydrolyzed polymers of methacrylonitrile, hydrolyzed polymers of methacrylonitrile, salts of copolymers of unsaturated polycarboxylic acids and at least one other monoolefinic monomer, copolymers of unsaturated polycarboxylic acids and at least one other monoelefinic monomer, salts of hydrolyzed copolymers of unsaturated polycarboxylic acid anhydrides and at least one other monoolefinic monomer, hydrolyzed copolymers of unsaturated polycarboxylic acid anhydrides and at least one other monoolefinic monomer, salts of copolymers of the partial alkyl esters of unsaturated polycarboxylic acids and at least one other monoolefinic monomer, copolymers of unsaturated dicarboxylic acid anhydrides and at least one other monoolefinic monomer, copolymers of the partial alkyl esters of unsaturated polycarboxylic acids and at least one other monoolefinic monomer, salts of sulfonated polymers of hydrocarbons containing aliphatic unsaturation, sulfonated polymers of hydrocarbons containing aliphatic unsaturation, polymers of amines containing aliphatic unsaturation, and polymers of amides containing aliphatic unsaturation.

ROSS M. HEDRICK.
DAVID T. MOWRY.

REFERENCES CITED

The following references are of record in the file of this patent:

Baver: "Soil Physics," 2nd ed., Wiley & Sons, N. Y. (1948), pp. 143–147.

Wilcox: "Modern Farmers Cyclopedia of Agriculture," Judd Publishing Co., N. Y. (1946), pp. 436 and 437.